(12) United States Patent
Tian et al.

(10) Patent No.: US 12,738,164 B2
(45) Date of Patent: Sep. 15, 2026

(54) SYSTEMS AND METHODS FOR USE IN DETERMINING RIGHT-OF-WAY TURN ALLOCATION

(71) Applicants: Honda Motor Co., Ltd., Tokyo (JP); University of Central Florida Research Foundation, Inc., Orlando, FL (US)

(72) Inventors: Danyang Tian, Ann Arbor, MI (US); Ehsan Moradi Pari, Ann Arbor, MI (US); Yaser Pourmohammadi Fallah, Oviedo, FL (US); Ghayoor Shah, Orlando, FL (US)

(73) Assignees: Honda Motor Co., Ltd., Tokyo (JP); University of Central Florida Research Foundation, Inc., Orlando, FL (US)

( * ) Notice: Subject to any disclaimer, the term of this patent is extended or adjusted under 35 U.S.C. 154(b) by 313 days.

(21) Appl. No.: 18/187,288

(22) Filed: Mar. 21, 2023

(65) Prior Publication Data

US 2024/0321101 A1 Sep. 26, 2024

(51) Int. Cl.
*G08G 1/16* (2006.01)
*H04W 4/46* (2018.01)

(52) U.S. Cl.
CPC ............. *G08G 1/163* (2013.01); *G08G 1/166* (2013.01); *H04W 4/46* (2018.02)

(58) Field of Classification Search
CPC ..... B60W 30/18154; B60W 30/18159; B60W 2555/60; H04W 4/46; G08G 1/091; G08G 1/093; G08G 1/096725; G08G 1/096741; G08G 1/096791; G08G 1/161; G08G 1/166
See application file for complete search history.

(56) References Cited

U.S. PATENT DOCUMENTS 9,950,271 B2 4/2018 Sofman et al.
9,953,538 B1 4/2018 Matthiesen et al.
(Continued)

FOREIGN PATENT DOCUMENTS

AU 2019232950 A1 3/2020
DE 102021207181 B3 * 10/2022
(Continued)

*Primary Examiner* — Fadey S. Jabr
*Assistant Examiner* — Mario C Gonzalez
(74) *Attorney, Agent, or Firm* — Armstrong Teasdale LLP

(57) ABSTRACT

Provided herein is a system for use in determining right-of-way. The system includes a host vehicle at or approaching an intersection, and the host vehicle includes a transceiver configured for vehicle-to-vehicle communication and a control unit. The control unit is configured to receive a local map of an area surrounding the intersection; receive, via the transceiver, a first signal from at least one client vehicle, wherein the first signal indicates the at least one client vehicle is at or approaching the intersection; determine, based upon a set of rules, that the host vehicle is an arbitrator, wherein the arbitrator assigns a priority value for right-of-way to each vehicle at or approaching the intersection; and transmit, via the transceiver, a second signal to the at least one client vehicle, wherein the second signal includes the assigned priority values for each vehicle at or approaching the intersection.

20 Claims, 5 Drawing Sheets

(56) References Cited

U.S. PATENT DOCUMENTS

| | | | | |
|---|---|---|---|---|
| 9,969,326 | B2 | 5/2018 | Ross et al. | |
| 10,059,334 | B1 | 8/2018 | Zhu et al. | |
| 10,160,378 | B2 | 12/2018 | Sweeney et al. | |
| 2008/0167821 | A1 * | 7/2008 | Breed | G08G 1/161 701/301 |
| 2014/0372016 | A1 * | 12/2014 | Buchholz | G08G 1/166 701/117 |
| 2019/0279508 | A1 * | 9/2019 | Wang | G05D 1/0278 |
| 2019/0287396 | A1 * | 9/2019 | Sayin | G08G 1/07 |
| 2023/0192090 | A1 * | 6/2023 | Pendleton | B60W 30/18154 701/117 |
| 2023/0322225 | A1 * | 10/2023 | Dörr | B60W 30/18159 701/23 |

FOREIGN PATENT DOCUMENTS

| | | | | |
|---|---|---|---|---|
| JP | 2006190187 | A | * | 7/2006 |
| JP | 2006350570 | A | * | 12/2006 |

* cited by examiner

SYSTEMS AND METHODS FOR USE IN DETERMINING RIGHT-OF-WAY TURN ALLOCATION

BACKGROUND

The present disclosure relates generally to vehicle-to-vehicle communication between automobiles and, more specifically, to systems and methods used to assign a turn or priority value for right-of-way for one or more vehicles at or approaching a stop-controlled intersection.

Traffic lights control the flow of vehicles through an intersection of two intersecting roads. A traffic light clearly instructs some vehicles to stop at the intersection (red light), which allows other vehicles to safely pass through the intersection (green light). However, not all intersections are controlled by traffic lights. As referred to herein, a stop-controlled intersection is an intersection of at least two roads where vehicles traveling on at least one of the roads are required to stop before passing through the intersection, and the intersection does not include traffic lights to control the flow of vehicles through the intersection. Examples of stop-controlled intersections may include two-way stops, three-way stops, and four-way stops, wherein stop signs indicate to drivers when they are required to stop before proceeding.

Any time two vehicles traveling on different roads, or in different directions on the same road, approach the same stop-controlled intersection, the drivers of those vehicles, or the vehicles themselves in the case of autonomous vehicles, need to determine which vehicle has the right-of-way to pass through the intersection first. When one of the two vehicles stops at the intersection a significant amount of time before the other vehicle, determining which vehicle has the right-of-way is not controversial (i.e., the vehicle stopped first has the right-of-way to pass through the intersection first). However, right-of-way becomes a subject of ambiguity whenever multiple vehicles arrive at a stop-controlled intersection at similar times and no vehicle has a clear priority. This ambiguity is further intensified in cases when there are queues of vehicles on lanes connecting to the stop-controlled intersection. When two or more vehicles arrive at these ambiguous right-of-way scenarios, there may be confusion about which vehicle has the right-of-way. This confusion can lead to anxiety for drivers of the vehicles, abrupt stopping as the right-of-way scenario is passed, accidents, and “road rage” if a driver of one of the vehicles believes their right-of-way was taken.

BRIEF DESCRIPTION

In one aspect, a system for use in determining right-of-way is provided. The system includes a host vehicle at or approaching an intersection, and the host vehicle includes a transceiver configured for vehicle-to-vehicle communication and a control unit. The control unit is configured to receive a local map of an area surrounding the intersection; receive, via the transceiver, a first signal from at least one client vehicle, wherein the first signal indicates the at least one client vehicle is at or approaching the intersection; determine, based upon a set of rules, that the host vehicle is an arbitrator, wherein the arbitrator assigns a priority value for right-of-way to each vehicle at or approaching the intersection; and transmit, via the transceiver, a second signal to the at least one client vehicle, wherein the second signal includes the assigned priority values for each vehicle at or approaching the intersection.

In another aspect, a system for use in determining right-of-way is provided. The system includes a first client vehicle at or approaching an intersection, and the first client vehicle includes a transceiver configured for vehicle-to-vehicle communication and a control unit. The control unit is configured to receive a local map of an area surrounding the intersection; receive, via the transceiver, a first signal from at least one of a host vehicle and a second client vehicle, wherein the first signal indicates the at least one of the host vehicle and the second client vehicle is at or approaching the intersection; determine, based upon a set of rules, that one of the host vehicle and the second client vehicle is an arbitrator, wherein the arbitrator assigns a priority value for right-of-way to each vehicle at or approaching the intersection; and receive, via the transceiver, a second signal from the arbitrator, wherein the second signal includes the assigned priority values for each vehicle at or approaching the intersection.

In yet another aspect, a system for use in determining right-of-way is provided. The system includes a host vehicle at or approaching an intersection, and the host vehicle includes a transceiver configured for vehicle-to-vehicle communication and a control unit. The control unit is configured to receive a local map of an area surrounding the intersection; receive, via the transceiver, a first signal from at least one client vehicle, wherein the first signal indicates the at least one client vehicle is at or approaching the intersection; determine, based upon a set of rules, that one of the at least one client vehicles is an arbitrator, wherein the arbitrator assigns a priority value for right-of-way to each vehicle at or approaching the intersection; and receive, via the transceiver, a second signal from the arbitrator, wherein the second signal includes the assigned priority values for each vehicle at or approaching the intersection.

DETAILED DESCRIPTION

The systems and methods described herein facilitate control and communication between vehicles to assign vehicles at or approaching an intersection, and more particularly, a right-of-way scenario, a turn (also referred to herein as “a priority value for right-of-way”) or allocation to continue through the intersection. In the exemplary scenarios described herein, a host vehicle communicates with other vehicles that are client vehicles in proximity to the host vehicle and at or approaching the same intersection as the host vehicle. For example, the host vehicle and the client vehicles can communicate with one another via signals, including DMS messaging, to (i) determine that the host vehicle and client vehicles are all approaching the same intersection, (ii) determine that the stop includes an ambiguous right-of-way scenario, (iii) assign, based upon a set of rules, an arbitrator to assign turns for each of the vehicles at or approaching the intersection, (iv) transmit or receive the turn assignments based upon whether or not the vehicle is the arbitrator, and (v) determine that each other vehicle has taken its turn to pass the stop. Accordingly, the systems and methods described herein facilitate directing vehicle traffic in ambiguous right-of-way scenarios in an efficient and controlled manner that facilitates reducing stress and anxiety.

Figure 1:
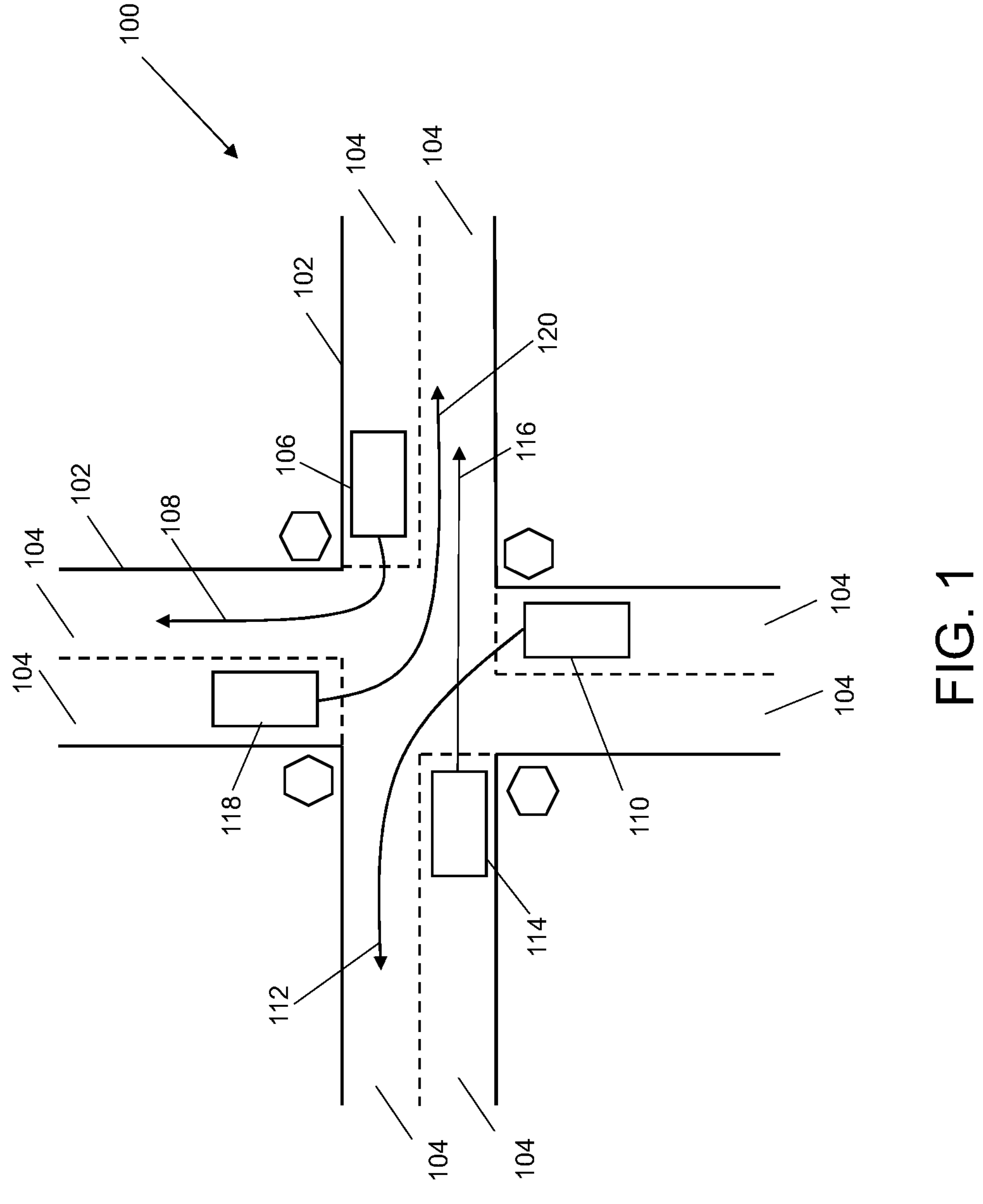
FIG. 1 illustrates an exemplary right-of-way (ROW) scenario.

Referring now to the drawings, FIG. 1 is an illustrative example of a right-of-way (ROW) scenario 100. In the exemplary embodiment, the ROW scenario 100 includes four roads 102 and eight lanes 104. Accordingly, there are many different directions that vehicles traveling on the roads 102 and within the lanes 104 can take within the ROW scenario 100. For example, a host vehicle 106 at or approaching the ROW scenario 100 may want to turn into a different lane 104 and take a path following arrow 108; a first client vehicle 110 at or approaching the ROW scenario 100 may want to turn into a different lane 104 and take a path following arrow 112; a second client vehicle 114 at or approaching the ROW scenario 100 may want to go straight in the same lane 104 and follow the arrow 116; and a third client vehicle 118 at or approaching the ROW scenario 100 may want to turn into a different lane 104 and take a path following arrow 120.

Because of the different path each vehicle 106, 110, 114, and 118 wants to follow, and the many different paths each vehicle 106, 110, 114, and 118 could follow, scenarios where right-of-way is hard to determine between vehicles 106, 110, 114, and 118 can be easily imagined. For example, it may be difficult to determine which vehicle 106, 110, 114, and 118 has the right-of-way to go first, second, third, or fourth, especially if vehicles 106, 110, 114, and 118 arrive at ROW scenario 100 at similar times and/or if other vehicles are behind vehicles 106, 110, 114, and 118. Similarly, if ROW scenario 100 were a parking lot, it may be difficult to determine which vehicle 106, 110, 114, and 118 would be entitled to an available parking spot. This may lead to ambiguity for the drivers of vehicles 106, 110, 114, and 118. Accordingly, the systems and methods described herein facilitate communication between vehicles and to assist in such ambiguous ROW scenarios.

In the exemplary embodiment, the ROW scenario 100 is a four-way stop. In other embodiments, the right-of-way scenario may be any location where a right-of-way is ambiguous, including, for example, a three-way stop, a roundabout, or an unmarked intersection. While the vehicles at or approaching ROW scenario 100 are described herein as host vehicle 106 and client vehicles 110, 114, and 118, it should be understood that any of the vehicles at or approaching ROW scenario 100 can act as a host vehicle or a client vehicle and that there is no substantial difference between host vehicle 106 and client vehicles 110, 114, and 118. Further, it should be understood that the systems and methods described herein can relate to any number of host vehicles 106 and client vehicles 110, 114, and 118 at ROW scenario 100. For example, additional vehicles may be lined up behind any of the vehicles 106, 110, 114, and 118, or only two or three vehicles 106, 110, 114, and 118 may be present at ROW scenario 100.

Figure 2:
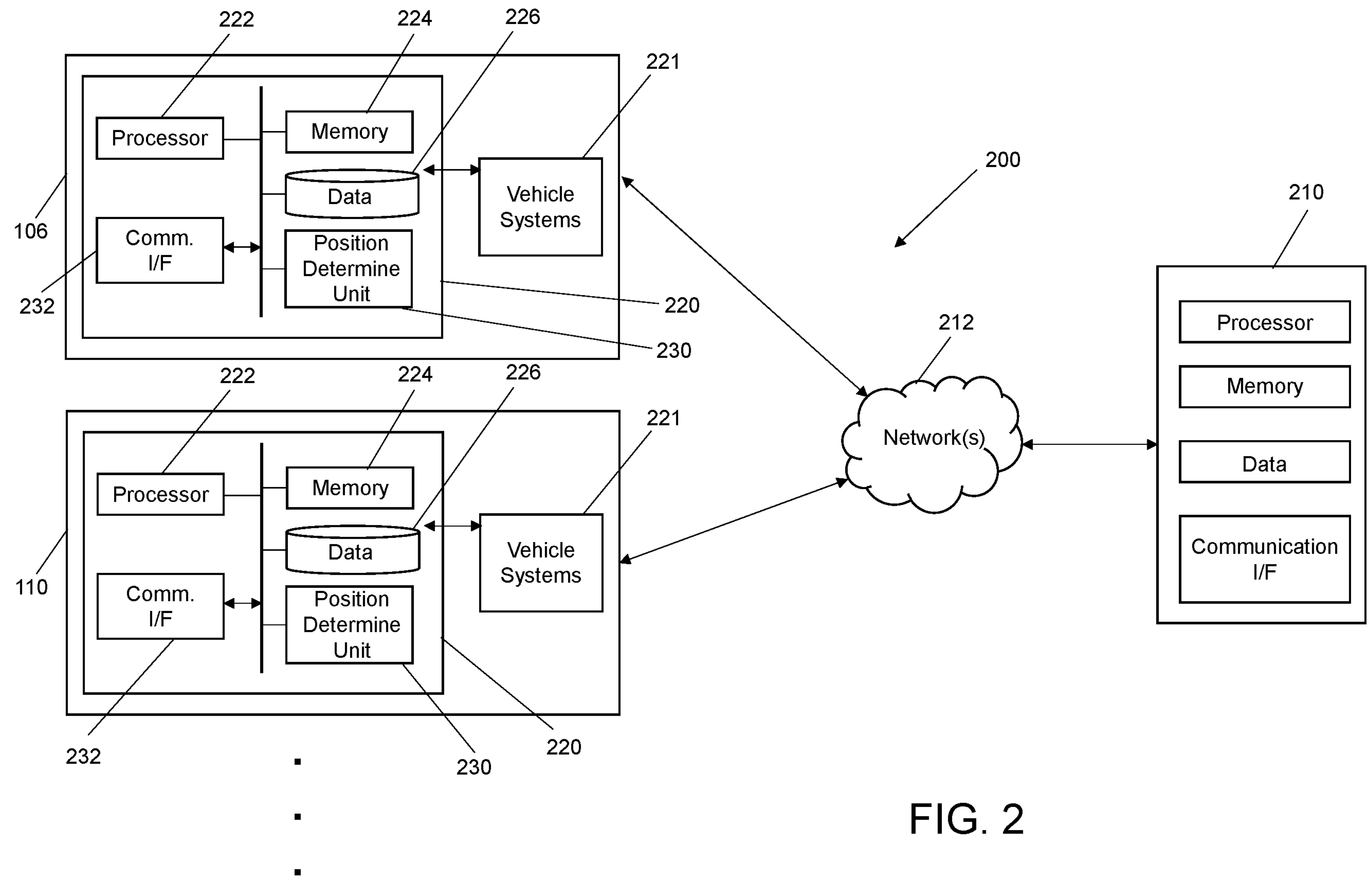
FIG. 2 is a schematic illustration of an exemplary ROW turn allocation system.

Referring now to FIG. 2, an exemplary system 200 for use in determining turns (i.e., which vehicle should advance next) for a ROW scenario is shown. System 200 can be implemented with the components shown in FIG. 1. For convenience, identical names and numerals are used in FIG. 2 to identify the same components identified in FIG. 1. In the exemplary embodiment, host vehicle 110, client vehicle 110, and a remote server 210 are each operatively coupled together to enable direct or indirect communication therebetween. For example, any of vehicles 106 and/or 110 may communicate with each other via a network 212 or may be capable of communicating directly with each other via a wireless network (not shown). For simplicity, only a single host vehicle 106 and a client vehicle 110 are illustrated, and additional host vehicles and client vehicles are not illustrated in FIG. 2. However, it should be understood that additional vehicles can include any of the components and/or functions described herein with respect to vehicles 106, 110, 114, and/or 118. Further, it should also be understood that the components of vehicles 106, 110, 114, and/or 118, and the remote server 210, as well as the components of other systems, hardware architectures, and software architectures discussed herein, can be combined, omitted, and/or organized into different architectures for various embodiments, without changing the scope of the disclosure.

In the exemplary embodiment, host vehicle 106 and client vehicle 110 each include a control unit or controller 220 and a vehicle system 221. Generally, controller 220 includes a processor 222, a memory 224, a data storage 226, a position determination unit 230 (named "position determine unit" in FIG. 2), and a communication interface (I/F) 232 (i.e., a transceiver 232), all of which are operably connected for communication via a bus and/or other wired and wireless technologies discussed herein. Controller 220 can include provisions for processing, communicating, and interacting with various components of its respective vehicle and other components of system 200, including any other vehicles within communicative proximity, and remote server 210.

Processor 222 includes logic circuitry with hardware, firmware, and software architecture frameworks that enable processing by host vehicle 106 and/or client vehicles 110, 114, and 118, and that facilitate communication between vehicles 106, 110, 114, and 118, and between any of vehicles 106, 110, 114, and 118 and remote server 210. Processor 222 is programmed with an algorithm that enables assignment of a turn for right-of-way, as described in more detail below. Thus, in some embodiments, processor 222 can store application frameworks, kernels, libraries, drivers, application program interfaces, among others, to execute and control hardware and functions discussed herein. In some embodiments, memory 224 and/or the data storage (e.g., a disk) 226 can store similar components as processor 222 for execution by processor 222.

In the exemplary embodiment, position determination unit 230 includes hardware (e.g., sensors) and software to determine and/or acquire position data about its respective vehicle. For example, position determination unit 230 can include a global positioning system (GPS) unit (not shown) and/or an inertial measurement unit (IMU) (not shown). Thus, position determination unit 230 can provide location data (e.g., a geoposition) associated with any of vehicles 106, 110, 114, and/or 118 based on satellite data received from, for example, a global position source unit, or from any Global Navigational Satellite infrastructure (GNSS), including, but not limited to GPS, Glonass (Russian) and/or Galileo (European). Further, position determination unit 230 can provide dead-reckoning data or motion data from, for example, a gyroscope, accelerometer, magnetometers, among other sensors (not shown). In some embodiments, position determination unit 230 can be a navigation system that provides navigation maps, map data, and navigation information to vehicles 106, 110, 114, and 118 to facilitate navigation of ROW scenario 100 (shown in FIG. 1), for example.

Communication interface (I/F) 232 can include software and hardware to facilitate data input and output between the components of controller 220 and other components of system 200. Specifically, communication I/F 232 can include network interface controllers (not shown) and other hardware and software that manages and/or monitors connections and controls bi-directional data transfer between communication I/F 232 and other components of system 200 using, for example, network 212. In particular, communication I/F 232 can facilitate communication (e.g., exchange data and/or transmit messages) with other vehicles and/or devices, using any type of communication hardware and/or protocols discussed herein. For example, the computer communication can be implemented using a wireless network antenna (e.g., cellular, mobile, satellite, or other wireless technologies) or road-side equipment (RSE) (e.g., Dedicated Short Range Communications or other wireless technologies), and/or network 212. Further, communication I/F 232 can also include input/output devices associated with the respective vehicle, such as a mobile device. In some embodiments described herein, communication between vehicles can be facilitated by displaying and/or receiving communication on a display within the respective vehicle.

Vehicle systems 221 can include any type of vehicle control system and/or system described herein to enhance the driving experience of vehicles 106, 110, 114, and/or 118. For example, vehicle systems 221 can include user interface systems, autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS).

Figure 3:
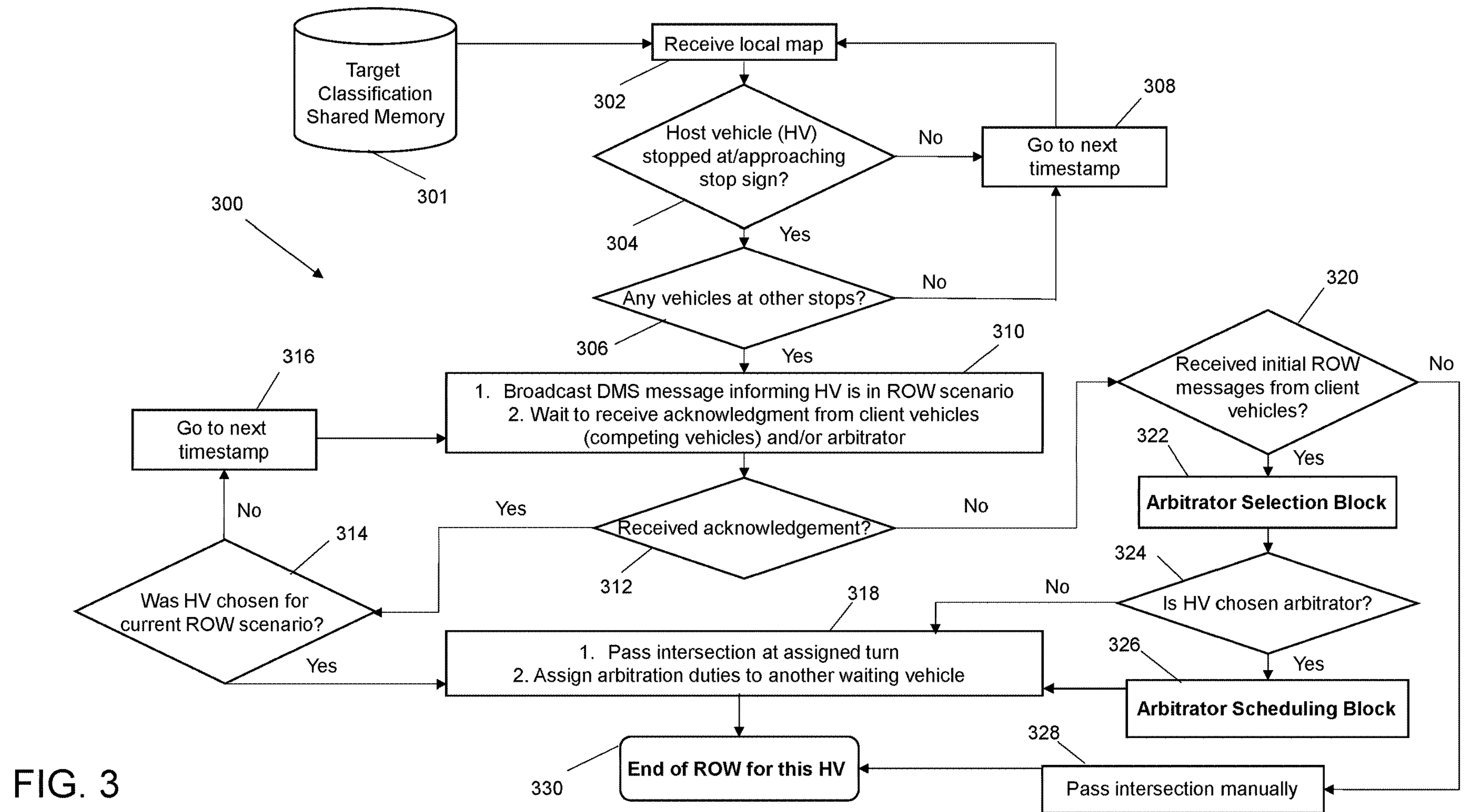
FIG. 3 is a flow diagram illustrating an exemplary method of determining ROW turn allocation.

With reference to FIG. 3, an exemplary method 300 is illustrated that may be implemented to allocate turns for right-of-way at a ROW scenario, such as four-way stop ROW scenario 100 (shown in FIG. 1), to each vehicle at or approaching the ROW scenario (e.g., vehicles 106, 110, 114, and 118), for example. In the exemplary embodiment, method 300 is described using the operations of one or more components illustrated in FIGS. 1 and 2, such as controller 220 and communication I/F 232 in vehicles 106, 110, 114, and/or 118, for example. Although FIG. 3 is described with respect to four vehicles 106, 110, 114, and 118, the methods and systems described herein can be applied to any number of vehicles. It should also be understood that the ROW scenario 100 associated with system 200 and method 300 may include any ROW scenario, as described above.

Initially, in the exemplary embodiment, system 200 receives 302 a local map of each area the vehicles 106, 110, 114, and 118 travel through. The local map may be received 302 from a target classification shared memory 301, for example. System 200 uses the local map and other data (e.g., data from cameras, radar, and/or vehicle communications) to determine 304 whether the host vehicle 106 is stopped at or approaching ROW scenario 100. If it is determined 304 that the host vehicle 106 is at or approaching ROW scenario 100, system 200 then determines 306 whether any other vehicles (e.g., client vehicles 110, 114, and/or 118) are also at or approaching ROW scenario 100. If it is determined 304 that host vehicle 106 is not at or approaching ROW scenario 100 and/or if it is determined 306 that no other vehicles (e.g., client vehicles 110, 114, and/or 118) are also at or approaching ROW scenario 100, the system 200 advances 308 to the next timestamp, the host vehicle 106 continues along its path of travel, and the method 300 begins again at receiving 302 the local map.

If it is determined 306 that there are other vehicles at or approaching ROW scenario 100, system 200 proceeds to method step 310. In step 310, a signal (e.g., a DMS message) is broadcast from host vehicle 106 to client vehicles 110, 114, and/or 118 informing client vehicles 110, 114, and/or 118 of ROW scenario 100. Further, in step 310, system 200 waits to receive acknowledgment of ROW scenario 100 from client vehicles 110, 114, and/or 118 and/or an arbitrator. For example, the arbitrator may be a client vehicle 110, 114, and/or 118 chosen to be the arbitrator before vehicle 106 started approaching ROW scenario 100. As described below, the arbitrator assigns turns, i.e., a priority list is created, for right-of-way at ROW scenario 100. System 200 may wait a predetermined time period (e.g., 5-10 milliseconds) before continuing on to the next step of method 300.

After the predetermined time period has elapsed, system 200 determines 312 whether acknowledgment from the arbitrator has been received. If it is determined 312 that acknowledgment from the arbitrator has been received, it is then determined 314 whether the host vehicle 106 was chosen by the arbitrator for a current ROW scenario 100. That is, it is determined 314 whether host vehicle 106 was assigned a turn for right-of-way at ROW scenario 100 or was instructed to wait for a next ROW scenario 100 (e.g., if there are multiple vehicles ahead of host vehicle 106 waiting to pass through ROW scenario 100). If it is determined 314 that host vehicle 106 was not chosen by the arbitrator for the current ROW scenario 100, system 200 advances 316 to the next timestamp and repeats method 300 again at step 310. If it is determined that host vehicle 106 was chosen for current ROW 100, system 200 advances to method step 318.

After the predetermined time period has elapsed, if it is determined 312 that acknowledgment from the arbitrator has not been received, it is then determined 320 whether an initial message has been received from client vehicles 110, 114, and/or 118. That is, it is determined 320 whether host vehicle 106 has received a message from client vehicles 110, 114, and/or 118 indicating that client vehicles 110, 114, and/or 118 are in ROW scenario 100, as would have been transmitted by client vehicles 110, 114, and/or 118 in method step 310. If it is determined 320 that host vehicle 106 has received one or more messages from client vehicles 110, 114, and/or 118, system 200 proceeds to method step 322 to select an arbitrator, as described in further detail with respect to FIG. 4. After an arbitrator has been selected 322, it is determined 324 whether host vehicle 106 is the chosen arbitrator. If host vehicle 106 is the chosen arbitrator, system 200 proceeds to method step 326 to schedule and assign turns, i.e., prioritizes, for right-of-way, as described in further detail with respect to FIG. 5. If host vehicle 106 is not the chosen arbitrator and/or after method step 326 has been completed, system 200 advances to method step 318.

At method step 318, host vehicle 106 and/or client vehicles 110, 114, and/or 118 are instructed to travel through ROW scenario 100 at their respective assigned turn. After host vehicle 106 and/or client vehicles 110, 114, and/or 118 travel through ROW scenario 100, each respective vehicle 106, 110, 114, and/or 118 transmits a signal (e.g., a DMS message) to every other respective vehicle 106, 110, 114, and/or 118 ROW scenario 1003 indicating that each respective vehicle has taken its assigned turn, i.e., advanced through the intersection. Moreover, in method step 318, if additional vehicles are at or approaching ROW scenario 100, the assigned arbitrator reassigns arbitration duties to another waiting vehicle 106, 110, 114, and/or 118.

If it is determined 320 that host vehicle 106 has not received one or more messages from client vehicles 110, 114, and/or 118, system 200 advances to method step 328. At method step 328, host vehicle 106 traverses the intersection manually, i.e., without input from system 200, because no signals from other vehicles 110, 114, and/or 118 are received.

After either method step 318 and/or step 328 has been completed, ROW scenario 100 and method 300 are ended 330 for the current host vehicle 106 and/or the current client vehicles 110, 114, and/or 118. Method 300 is repeated by system 200 as many times as necessary to assist all host vehicles 106 and client vehicles 110, 114, and 118 with navigating and prioritizing or assigning turns for each ROW scenario the vehicles encounter.

Figure 4:
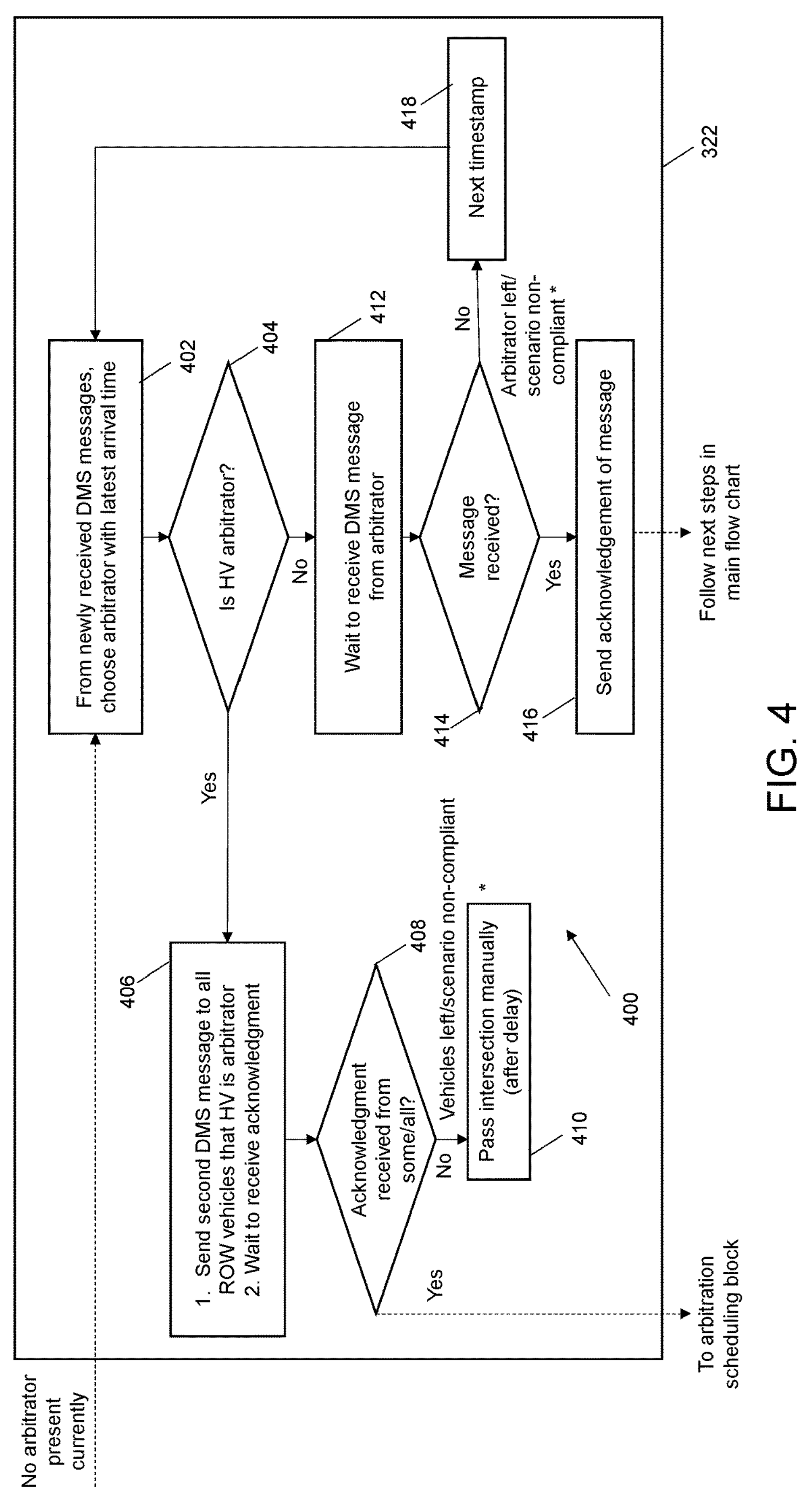
FIG. 4 is a flow diagram illustrating an exemplary method of selecting an arbitrator associated with the method illustrated in FIG. 3.

With reference to FIG. 4, an exemplary method 400 is illustrated that may be implemented within arbitration selection block 322 of method 300 (shown in FIG. 3) to facilitate selecting an arbitrator amongst host vehicle 106 and/or client vehicles 110, 114, and/or 118. As described with respect to method 300, method 400 may be implemented by system 200.

Initially, method 400 begins with no arbitrator being present. From the messages received from host vehicle 106 and/or client vehicles 110, 114, and/or 118, an arbitrator is chosen 402 from amongst the vehicles based upon a set of pre-defined rules. For example, in the exemplary embodiment, the arbitrator is chosen 402 based upon the vehicle with the latest arrival time. In other embodiments, the arbitrator is chosen 402 based upon other rules including, for example, the vehicle with the earliest or most recent arrival time, the vehicle that has been in the most ROW scenarios 100, etc.

Once the arbitrator is chosen 402, it is determined 404 whether host vehicle 106 is the arbitrator. If host vehicle 106 is the arbitrator, host vehicle 106 sends a signal (e.g., a DMS message) at method step 406 to each client vehicle 110, 114, and/or 118 that is within a predetermined proximity of ROW 100, notifying the client vehicles that host vehicle 106 is the arbitrator. Further, at method step 406, host vehicle 106 waits until a predetermined time period has elapsed to receive acknowledgment from the client vehicles that host vehicle 106 is the arbitrator. Host vehicle 106 may wait, for example, 5 milliseconds or 10 milliseconds before advancing to the next step of method 400. After host vehicle 106 has waited the predetermined time period, it is determined 408 whether acknowledgment of host vehicle 106 being the arbitrator has been received by at least some of client vehicles 110, 114, and/or 118. If it is determined 408 that acknowledgment has been received, method 400 advances to arbitration scheduling block, as described in more detail with respect to FIG. 5. If it is determined 408 that no acknowledgment has been received, host vehicle 106 traverses through ROW scenario 100 manually, after the predefined brief delay.

If it is determined 404 that host vehicle 106 is not the arbitrator, host vehicle 106 waits 412 to receive a signal (e.g., a DMS message) from the arbitrator. Host vehicle 106 waits a predetermined amount of time (e.g., 5 milliseconds or 10 milliseconds) before determining 414 whether the signal from the arbitrator has been received. If it is determined 414 that the message is received, host vehicle 106 sends 416 an acknowledgment of the message to the arbitrator and proceeds to the next method step. If it is determined 414 that no message has been received (e.g., if the arbitrator has left or the scenario is non-compliant), host vehicle 106 advances 418 to the next timestamp, and method 400 repeats beginning with method step 402.

Figure 5:
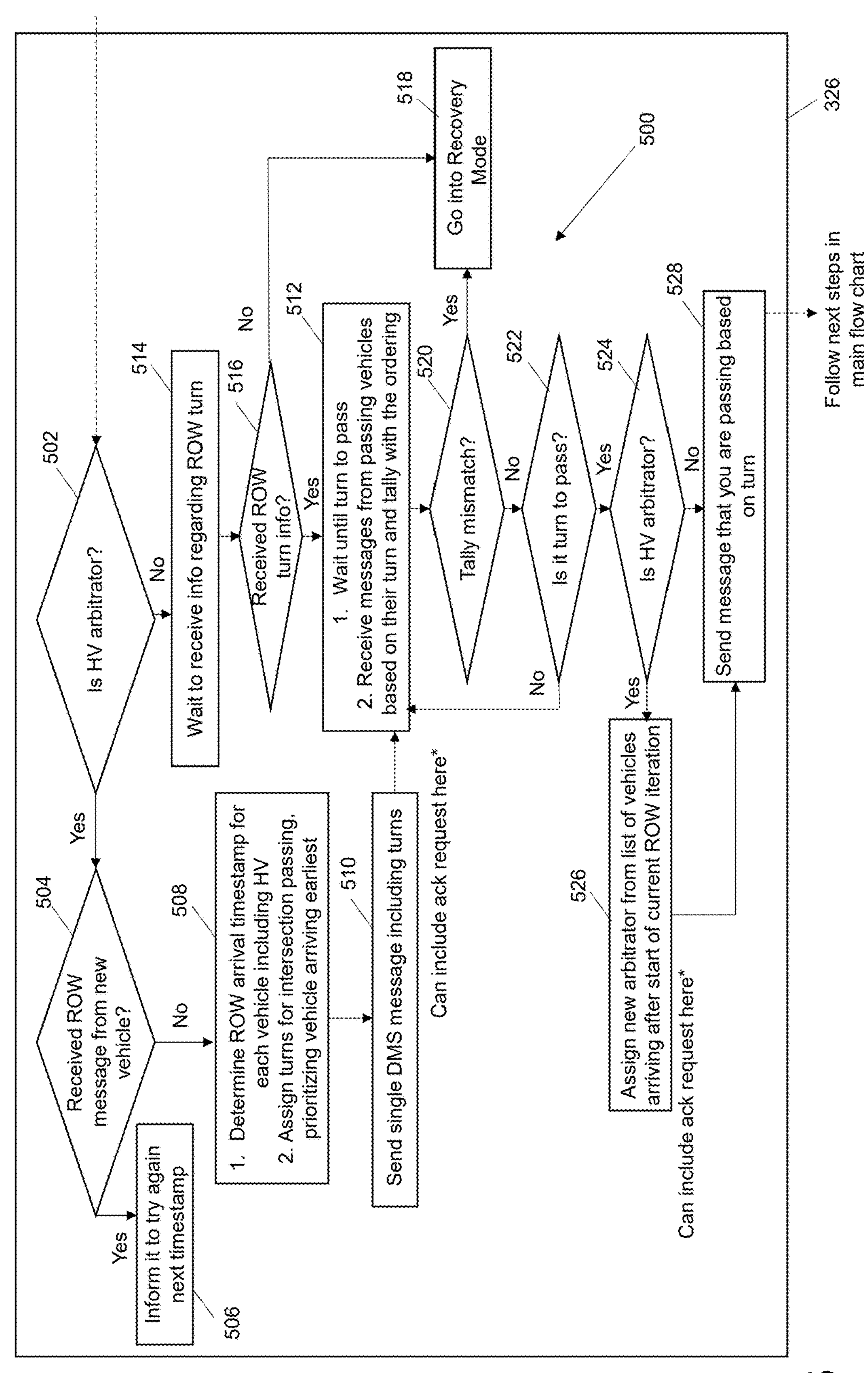
FIG. 5 is a flow diagram illustrating an exemplary method of scheduling an arbitrator associated with the method illustrated in FIG. 3.

With reference to FIG. 5, an exemplary method 500 is illustrated that may be implemented within arbitration selection block 322 of method 300 (shown in FIG. 3) to schedule or prioritize turns for each vehicle 106, 110, 114, and/or 118 at ROW scenario 100 (shown in FIG. 1). As described with respect to method 300, method 500 may be implemented by system 200.

Initially, method 500 begins with determining 502 whether host vehicle 106 is the arbitrator. If it is determined 502 that host vehicle 106 is the arbitrator, it is then determined 504 whether a signal from a new vehicle (e.g., a vehicle not currently included in ROW scenario 100) has been received. For example, it may be determined 504 whether a message from a new vehicle has been received indicating that the new vehicle is at or approaching ROW scenario 100. If it is determined 504 that a signal has been received, host vehicle 106 transmits 506 a signal to the new vehicle informing the new vehicle to try again at the next timestamp. If it is determined 504 that a signal has not been received, method 500 proceeds to method step 508. At method step 508, host vehicle 106 determines an arrival timestamp for each vehicle at or approaching ROW scenario 100, including an arrival timestamp for host vehicle 106 itself. Further, at method step 508, host vehicle 106 assigns turns i.e., prioritizes, for traversing through ROW scenario 100 based upon a set of predefined rules. For example, in the exemplary embodiment, the vehicle arriving at ROW scenario 100 earliest is given the first turn, the vehicle arriving at ROW scenario 100 second is given the second turn, etc. In other embodiments, different factors may be considered before the turns are assigned, or the assigned turns may be adjusted or prioritized based on different factors. For example, in one embodiment, a client vehicle 110, 114, and/or 118 may transmit an urgency level to host vehicle 106 notifying host vehicle 106, acting as the arbitrator, that client vehicle 110, 114, and/or 118 urgently needs to travel through ROW scenario 100. In this case, host vehicle 106 may adjust the assigned turns such that the vehicles that transmitted urgency levels are given the priority to traverse through ROW scenario 100. After step 508 is completed, a signal (e.g., a single DMS message) is transmitted 510 to the vehicle indicating the priority listing or assigned turns for each vehicle. The signal transmitted at method step 510 may include an acknowledgement request. After method step 510 is completed, method 500 proceeds to step 512.

If it is determined 502 that host vehicle 106 is not the arbitrator, host vehicle 106 waits 512 a predetermined amount of time to receive a signal regarding the assigned turn of host vehicle 106 from the arbitrator (e.g., one of client vehicles 110, 114, and 118). For example, host vehicle may wait 512 five or ten milliseconds before proceeding to determine 516 whether the turn information has been received. If it is determined 516 that the turn information has not been received, method 500 proceeds to step 518. At method step 518, system 200 goes into a recovery mode because one or more vehicles 106, 110, 114, and 118 have carried out a non-compliant action (e.g., passing ROW scenario 100 out of the assigned turn of vehicle 106, 110, 114, 118). When system 200 goes into the recovery mode, system 200 of vehicles 106, 110, 114, and 118 is reverted back to receiving 302 (shown in FIG. 3) a local map of each area around vehicles 106, 110, 114, and 118 and/or method step 310 (shown in FIG. 3) of (i) broadcasting a is broadcast from host vehicle 106 to client vehicles 110, 114, and/or 118 informing client vehicles 110, 114, and/or 118 of ROW scenario 100 and (ii) waiting to receive acknowledgment of ROW scenario 100 from client vehicles 110, 114, and/or 118 and/or an arbitrator. If it is determined 516 that the priority listing or turn information has been received, method 500 proceeds to method step 512.

At method step 512, each vehicle 106, 110, 114, and/or 118 waits until its assigned turn to travel through ROW scenario 100. Further, at method step 512, while the vehicles are waiting for their respective turn, each vehicle receives signals (e.g., DMS messages) from each passing vehicle based on the respective turn of the passing vehicle, and the ordering of the signals is tallied and compared to the assigned turns of each vehicle 106, 110, 114, and/or 118. It is determined 520 by the vehicles if there is a tally mismatch as the vehicles wait for their respective turn. If it is determined 520 that there is a tally mismatch, system 200 enters the recovery mode at step 518. If it is determined 520 that there is not a tally mismatch, it is determined 522 whether it is the respective vehicle's 106, 110, 114, and/or 118 turn to traverse through the ROW situation 100. If it is determined 522 that it is not the respective vehicle's 106, 110, 114, and/or 118 turn to travel through the ROW situation 100, the respective vehicle continues to wait for its turn. If it is determined 522 that it is the respective vehicle's 106, 110, 114, and/or 118 turn to pass, method 500 proceeds to determining 524 whether host vehicle 106 is the arbitrator.

If it is determined 524 that host vehicle 106 is the arbitrator, method 500 advances to step 526. At method step 526, host vehicle 106 assigns a new arbitrator from a list of vehicles arriving at or approaching ROW scenario 100 after the start of the current ROW iteration. Further, at step 526, host vehicle 106 can request an acknowledgment signal from the newly assigned arbitrator that the arbitration duties are confirmed. After method step 526 has been completed, method 500 proceeds to method step 528. If it is determined 524 that host vehicle 106 is not the arbitrator, each respective vehicle 106, 110, 114, and/or 118 transmits 528 a message to each other respective vehicle 106, 110, 114, and/or 118 that the respective vehicle is taking its turn and traversing through ROW scenario 100. After method step 528 is completed, method 500 proceeds to the next step of method 300.

As shown and described with respect to FIGS. 3, 4, and 5, methods 300, 400, and 500 ensure communication and coordination between multiple vehicles (e.g., host vehicle 106 and/or client vehicles 110, 114, and/or 118) at or approaching a right-of-way scenario (e.g., right-of-way scenario 100, shown in FIG. 1). Because criteria and rules are followed via communication between the vehicles, groups of vehicles are formed and coordination between the groups of vehicles ensures that each vehicle can pass the right-of-way scenario safely and efficiently with limited deadlock, even when compliance of the communication protocols are not at 100% between the vehicles. Selecting the arbitrator based upon a set of rules and having the arbitrator assign turns for passing the right-of-way scenario based upon another set of rules ensures that each vehicle is fairly assigned their turn, limiting stress and anxiety as the right-of-way scenario is approached and passed.

The embodiments described herein relate generally to systems and methods to facilitate control and communication between vehicles to navigate a right-of-way scenario and assign turns to the vehicles for right-of-way in passing the right-of-way scenario. In the exemplary embodiments, a host vehicle communicates with other client vehicles that are at or approaching a right-of-way scenario (e.g., an intersection with one or more stop signs). The host vehicle and/or one of the client vehicles is identified as the arbitrator, and the arbitrator assigns the turns for right-of-way in passing the right-of-way scenario based on a set of criteria. Accordingly, the systems and methods described herein facilitate assigning turns and navigating a right-of-way scenario in an efficient and controlled manner that facilitates reducing stress and anxiety.

Exemplary embodiments of a right-of-way assignment system are described above in detail. Although the system herein is described and illustrated in association with automobiles at a four-way stop right-of-way scenario, the system could be used to assign turns for right-of-way in different scenarios, including navigating ships at a marina, and/or trucks at a loading dock, for example. Moreover, it should also be noted that the components of the disclosure are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in determining right-of-way, the system comprising:

a host vehicle at or approaching an intersection, the host vehicle comprising:
- a transceiver configured for vehicle-to-vehicle communication; and
- a control unit configured to:
  - receive, via the transceiver, a first signal from at least one client vehicle, wherein the first signal indicates the at least one client vehicle is at or approaching the intersection;
  - determine, based upon a set of rules and the first signal, that the host vehicle is an arbitrator, wherein the arbitrator assigns a priority value for right-of-way to each of the at least one client vehicle at or approaching the intersection;
  - transmit, via the transceiver, a second signal to the at least one client vehicle, wherein the second signal includes the assigned priority values for each of the at least one client vehicle at or approaching the intersection;
  - control the host vehicle to wait a predetermined time period to receive an acknowledgment message from the at least one client vehicle;
  - determine that at least one of the at least one client vehicle has carried out an action that is not compliant with the assigned priority value for the vehicle by tallying an order of a plurality of received signals and comparing the tally to the assigned priority values; and
  - control the host vehicle to enter a recovery mode based upon the determination of the non-compliant action, wherein the recovery mode includes reassigning priority values for each of the at least one client vehicle at or approaching the intersection.

2. The system in accordance with claim 1, wherein the host vehicle further comprises a camera and radar, and wherein the control unit is further configured to:

receive a local map of an area surrounding the intersection;

analyze at least one of the local map, camera data, and radar data to determine that the intersection includes a right-of-way scenario;

transmit, via the transceiver, a third signal notifying the at least one client vehicle of the right-of-way scenario, wherein the third signal further includes a message to the at least one client vehicle indicating that the host vehicle is the arbitrator; and wherein the acknowledgment message includes acknowledgment of at least one of the right-of-way scenario and the host vehicle being the arbitrator.

3. The system in accordance with claim 2, wherein the control unit, when the acknowledgment message is received within the predetermined time period, is further configured to:

determine an arrival timestamp for each of the at least one client vehicle at or approaching the intersection, wherein the arrival timestamp is determined based upon the acknowledgment message; and assign priority values to each of the at least one client vehicle at or approaching the intersection based upon the determined arrival timestamp, wherein the priority value corresponds to an order in which each of the at least one client vehicle is allowed to pass the intersection, and wherein a first priority value is assigned to a vehicle at or approaching the intersection first.

4. The system in accordance with claim 3, wherein the acknowledgment message further includes an urgency level, and wherein the control unit is further configured to:

adjust the arrival timestamp based upon an average speed of each of the at least one client vehicle during previous time periods at or approaching the intersection; and adjust the assigned priority values for each of the at least one client vehicle at or approaching the intersection based upon at least one of the urgency level and the adjusted arrival timestamp.

5. The system in accordance with claim 4, wherein the control unit is further configured to:

instruct the host vehicle to pass the intersection at the assigned priority value of the host vehicle;

transmit, via the transceiver, a fourth signal to the at least one client vehicle indicating that the host vehicle has passed the intersection at the assigned priority value of the host vehicle; and after the host vehicle has passed the intersection, assign, based upon the set of rules, a second arbitrator selected from remaining vehicles of the at least one client vehicle at or approaching the intersection, wherein the second arbitrator assigns priority values for right-of-way to the remaining vehicles of the at least one client vehicle.

6. The system in accordance with claim 5, wherein the control unit is further configured to:

receive, via the transceiver, a passing signal from each of the at least one client vehicles at or approaching the intersection indicating that each of the at least one client vehicles at or approaching the intersection are passing the intersection based on the respective assigned priority values;

compare the passing signal with the assigned priority values; and instruct, when there is a discrepancy between the passing signal and the assigned priority values, the host vehicle to go into the recovery mode.

7. The system in accordance with claim 1, wherein the set of rules includes at least one rule prioritizing a vehicle that has been in the most historical right-of-way scenarios.

8. A system for use in determining right-of-way, the system comprising:

a first client vehicle at or approaching an intersection, the first client vehicle comprising:

a transceiver configured for vehicle-to-vehicle communication; and a control unit configured to:

receive, via the transceiver, a first signal from at least one of a host vehicle and a second client vehicle, wherein the first signal indicates the at least one of the host vehicle and the second client vehicle is at or approaching the intersection;

determine, based upon a set of rules and the first signal, that one of the host vehicle and the second client vehicle is an arbitrator, wherein the arbitrator assigns a priority value for right-of-way to each of one or more client vehicles at or approaching the intersection;

receive, via the transceiver, a second signal from the arbitrator, wherein the second signal includes the assigned priority values for each of the one or more client vehicles at or approaching the intersection; and control the host vehicle to wait a predetermined time period to receive an acknowledgment message from the second client vehicle;

determine that at least one of the one or more client vehicles has carried out an action that is not compliant with the assigned priority value for the vehicle by tallying an order of a plurality of received signals and comparing the tally to the assigned priority values; and control the host vehicle to enter a recovery mode based upon the determination of the non-compliant action, wherein the recovery mode includes reassigning priority values for each of the one or more client vehicles at or approaching the intersection.

9. The system in accordance with claim 8, wherein the first client vehicle further comprises a camera and radar, and wherein the control unit is further configured to:

receive a local map of an area surrounding the intersection;

analyze at least one of the local map, camera data, and radar data to determine that the intersection includes a right-of-way scenario; and transmit, via the transceiver, a third signal notifying the at least one of the host vehicle and the second client vehicle of the right-of-way scenario, wherein the third signal further includes an acknowledgment message to one of the host vehicle and the second client vehicle acknowledging that one of the host vehicle and the second client vehicle is the arbitrator.

10. The system in accordance with claim 9, wherein the acknowledgment message further includes an urgency level.

11. The system in accordance with claim 10, wherein the control unit is further configured to:

instruct the first client vehicle to pass the intersection at the assigned priority value of the first client vehicle; and transmit, via the transceiver, a fourth signal to the host vehicle and the second client vehicle indicating that the first client vehicle has passed the intersection at the assigned priority value of the first client vehicle.

12. The system in accordance with claim 11, wherein the control unit is further configured to:

receive, via the transceiver, a passing signal from each of the one or more client vehicles at or approaching the intersection indicating that each of the one or more client vehicles at or approaching the intersection are passing the intersection based on the respective assigned priority values;

compare the passing signal with the assigned priority values; and instruct, when there is a discrepancy between the passing signal and the assigned priority values, the first client vehicle to go into the recovery mode.

13. The system in accordance with claim 1, wherein the set of rules includes at least one rule prioritizing a vehicle that has been in the most historical right-of-way scenarios.

14. A system for use in determining right-of-way, the system comprising:

a host vehicle at or approaching an intersection, the host vehicle comprising:

a transceiver configured for vehicle-to-vehicle communication; and a control unit configured to:

receive, via the transceiver, a first signal from at least one client vehicle, wherein the first signal indicates the at least one client vehicle is at or approaching the intersection;

determine, based upon a set of rules and the first signal, that one of the at least one client vehicles is an arbitrator, wherein the arbitrator assigns a priority value for right-of-way to each of the at least one client vehicle at or approaching the intersection;

receive, via the transceiver, a second signal from the arbitrator, wherein the second signal includes the assigned priority values for each of the at least one client vehicle at or approaching the intersection; and control the host vehicle to wait a predetermined time period to receive an acknowledgment message from the at least one client vehicle;

determine that at least one of the at least one client vehicle has carried out an action that is not compliant with the assigned priority value for the vehicle by tallying an order of a plurality of received signals and comparing the tally to the assigned priority values; and control the host vehicle to enter a recovery mode based upon the determination of the non-compliant action, wherein the recovery mode includes reassigning priority values for each of the at least one client vehicle at or approaching the intersection.

15. The system in accordance with claim 14, wherein the host vehicle further comprises a camera and radar, and wherein the control unit is further configured to:

receive a local map of an area surrounding the intersection;

analyze at least one of the local map, camera data, and radar data to determine that the intersection includes a right-of-way scenario; and transmit, via the transceiver, a third signal notifying the at least one client vehicle of the right-of-way scenario, wherein the third signal further includes an acknowledgment message to the client vehicle acknowledging that the client vehicle is the arbitrator.

16. The system in accordance with claim 15, wherein the acknowledgment message further includes an urgency level.

17. The system in accordance with claim 16, wherein the control unit is further configured to:

instruct the host vehicle to pass the intersection at the assigned priority value of the host vehicle; and transmit, via the transceiver, a fourth signal to the at least one client vehicle indicating that the host vehicle has passed the intersection at the assigned priority value of the host vehicle.

18. The system in accordance with claim 17, wherein the control unit is further configured to:

receive, via the transceiver, a passing signal from each of the vehicles at or approaching the intersection indicating that each of the vehicles at or approaching the intersection are passing the intersection based on the respective assigned priority values; and compare the passing signal with the assigned priority values.

19. The system in accordance with claim 18, wherein the control unit, when there is a discrepancy between the passing signal and the assigned priority values, is further configured to:

instruct the host vehicle to go into the recovery mode.

20. The system in accordance with claim 14, wherein the set of rules includes at least one rule prioritizing a vehicle that has been in the most historical right-of-way scenarios.

* * * * *